(12) United States Patent
Rudolf et al.

(10) Patent No.: US 7,200,405 B2
(45) Date of Patent: Apr. 3, 2007

(54) METHOD AND SYSTEM FOR PROVIDING CHANNEL ASSIGNMENT INFORMATION USED TO SUPPORT UPLINK AND DOWNLINK CHANNELS

(75) Inventors: Marian Rudolf, Montreal (CA); Stephen G. Dick, Nesconset, NY (US); Philip J. Pietraski, Huntington Station, NY (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 10/902,740

(22) Filed: Jul. 29, 2004

(65) Prior Publication Data

US 2005/0105487 A1 May 19, 2005

Related U.S. Application Data

(60) Provisional application No. 60/523,049, filed on Nov. 18, 2003.

(51) Int. Cl.
*H04Q 7/20* (2006.01)

(52) U.S. Cl. .................... 455/450; 455/451; 455/452.1; 370/329

(58) Field of Classification Search ............... 455/450, 455/451, 452.1; 320/329
See application file for complete search history.

(56) References Cited

U.S. PATENT DOCUMENTS

| | | | |
|---|---|---|---|
| 5,404,355 A * | 4/1995 | Raith | ............... 370/311 |
| 5,722,077 A * | 2/1998 | Kanai | ............... 455/452.1 |
| 5,845,212 A * | 12/1998 | Tanaka | ............... 455/437 |
| 6,172,971 B1 * | 1/2001 | Kim | ............... 370/348 |
| 6,430,163 B1 | 8/2002 | Mustajarvi et al. | |

(Continued)

FOREIGN PATENT DOCUMENTS

DE 19855242 5/2000

(Continued)

OTHER PUBLICATIONS

3GPP TSG RAN WG Tdoc R1-02-0018, Nokia, "Compact Signaling of Multi-code Allocation of HSDPA, version 2," Espoo, Finland, Jan. 2002.

(Continued)

*Primary Examiner*—Joseph Feild
*Assistant Examiner*—David Q. Nguyen
(74) *Attorney, Agent, or Firm*—Volpe and Koenig, P.C.

(57) ABSTRACT

A method and wireless communication system for providing channel assignment information used to support an uplink (UL) channel and a downlink (DL) channel. The system includes at least one Node-B and at least one wireless transmit/receive unit (WTRU). The WTRU communicates with the Node-B via a common control channel, the UL channel and the DL channel. The WTRU receives a message from the Node-B via the common control channel. The message includes an indication of whether the message is intended for assigning radio resources to the UL channel or the DL channel. The WTRU determines whether the message is intended for the WTRU and, if so, the WTRU determines whether the message is for assigning radio resources to the UL channel or the DL channel. The WTRU takes an appropriate action based on whether the message is for assigning radio resources to the UL channel or the DL channel.

42 Claims, 2 Drawing Sheets

U.S. PATENT DOCUMENTS

| | | | |
|---|---|---|---|
| 6,882,727 B1* | 4/2005 | Vialen et al. | 380/33 |
| 6,901,104 B1* | 5/2005 | Du et al. | 375/142 |
| 2003/0219037 A1* | 11/2003 | Toskala et al. | 370/496 |
| 2004/0043783 A1* | 3/2004 | Anderson | 455/522 |
| 2004/0085989 A1* | 5/2004 | Boumendil et al. | 370/442 |

FOREIGN PATENT DOCUMENTS

| | | |
|---|---|---|
| EP | 1248476 | 10/2002 |
| EP | 1324500 | 12/2002 |
| GB | 2383956 | 12/2001 |
| WO | 02/51177 | 6/2002 |

OTHER PUBLICATIONS

3GPP TSG RAN WG 1 Tdoc R1-02-1277, Noika, "Two Threshold Node B Packet Scheduling," Shanghai, China, Nov. 2002.

3GPP TSG RAN WG 1 Tdoc R1-02-1350, Motorola, "Design Considerations for Enhanced uplink Dedicated Channel," Shanghai, China, Nov. 2002.

Mouly et al. "Chapter 4, The Radio Interface," The GSM System for Mobile Communications; 1992, pp. 186-259.

3GPP TSG RAN WG Tdoc R1-02-0018, Nokia, "Compact Signalling of Multi-code Allocation for HSDPA, version 2," Espoo, Finland, Jan. 2002.

* cited by examiner

US 7,200,405 B2

METHOD AND SYSTEM FOR PROVIDING CHANNEL ASSIGNMENT INFORMATION USED TO SUPPORT UPLINK AND DOWNLINK CHANNELS

CROSS REFERENCE TO RELATED APPLICATION

This application claims the benefit of U.S. Provisional Application No. 60/523,049 filed on Nov. 18, 2003, which is incorporated by reference as if fully set forth.

FIELD OF INVENTION

The present invention is related to a wireless communication system. More particularly, the present invention is related to a method and system for providing channel assignment information to support uplink and downlink transmissions.

BACKGROUND

High speed downlink packet access (HSDPA) has been developed to increase downlink (DL) efficiency and throughput in universal mobile telecommunication system (UMTS) Release 5 (R5) wideband code division multiple access (W-CDMA) systems. The key advantages of HSDPA as compared to UMTS R99/R4 are fast and dynamic link adaptation in the DL and a fast layer 1 hybrid automatic repeat request (H-ARQ). Fast link adaptation is achieved by fast scheduling DL transmissions in a base station, coupled with fast layer 1 DL signaling channels. The signaling channel, a high speed shared control channel (HS-SCCH), conveys radio resource allocation information to a plurality of wireless transmit/receive units (WTRUs).

In frequency division duplex (FDD), an HS-SCCH is sent by means of a spreading factor (SF)=128 channelization code during a three (3) time slot transmission time interval (TTI). The HS-SCCH indicates that data would be transmitted to a WTRU on a high speed downlink shared channel (HS-DSCH) after a particular time offset. The HS-SCCH carries the following information: 1) channelization-code-set information (7 bits); 2) modulation scheme information (1 bit); 3) transport-block size information (6 bits); 4) H-ARQ process information (3 bits); 5) redundancy and constellation version (3 bits); 6) new data indicator (1 bit); and 7) a WTRU identity (16 bits).

The HS-SCCH is sent over three (3) time slots (2 ms TTI), but consists of two (2) fields. Field 1 (first time slot) contains channelization code mapping and modulation format information; and field 2 (second and third time slots) contains transport block size, H-ARQ information, redundancy version and a new data indicator along with a WTRU-specific cyclic redundancy check (CRC).

Alternatively, an enhanced uplink (EU) increases uplink (UL) efficiency and throughput. H-ARQ and Node-B scheduling is part of the EU. Similar to an HSDPA, a new shared DL control channel for EU operation provides fast and dynamic allocation of UL radio resources for UL transmissions. The shared DL control channel for the EU needs to ensure low allocation latencies and efficient radio resources management for UL transmissions. Hereinafter, the shared DL control channel for the purposes of an EU is simply referred to as a UL resource assignment channel.

In order to implement an EU along with an HSDPA, another UL resource assignment channel for the EU could be introduced on top of an existing HS-SCCH for an HSDPA. Thus, it is possible to introduce a separate set of SF=128 DL channels as UL resource assignment channels. With this approach, a WTRU would be required to monitor one or more UL resource assignment channels in addition to the HS-SCCHs for an HSDPA operation. Although this approach is conceptually simple, there are many disadvantages with this scheme, such as WTRU complexity, WTRU battery efficiency, and DL spreading code usage.

Therefore, an efficient EU channel assignment scheme is necessary for supporting both an EU and an HSDPA operation.

SUMMARY

In one embodiment, the present invention is a method and wireless communication system for providing channel assignment information for supporting a UL channel and a DL channel. The system includes at least one Node-B and at least one WTRU. The WTRU communicates with the Node-B via a common control channel, the UL channel and the DL channel. The WTRU receives a message from the Node-B via the common control channel. The message includes an indication of whether the message is intended for assigning radio resources to the UL channel or the DL channel. The WTRU determines whether the message is intended for the WTRU and, if so, the WTRU determines whether the message is for assigning radio resources to the UL channel or the DL channel. The WTRU takes an appropriate action based on whether the message is for assigning radio resources to the UL channel or the DL channel.

In another embodiment, the present invention is a method and time-slotted wireless communication system. The system includes at least one Node-B, a radio network controller (RNC) which controls the Node-B, and at least one WTRU which communicates with the Node-B via a common control channel, a UL channel and a DL channel. The RNC transmits a message to the WTRU indicating which time slot TTIs support UL channel transmissions and which time slot TTIs support DL channel transmissions.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENTS

Figure 1:
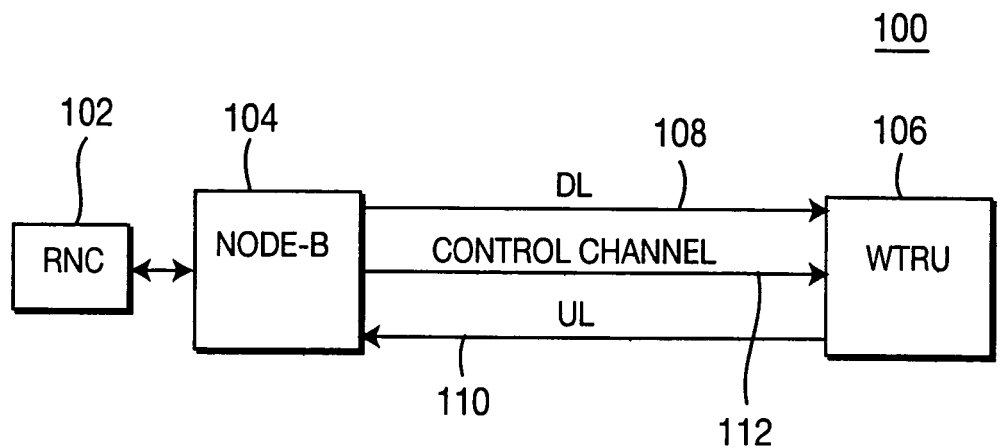
FIG. 1 is a block diagram of a wireless communication system operating in accordance with the present invention.

The present invention will be described with reference to the drawing figures wherein like numerals represent like elements throughout.

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The present invention is applicable to any type of wireless communication systems such as UMTS-time division duplex (TDD) and FDD, time division synchronous code division multiple access (TDSCDMA), code division multiple access 2000 (CDMA 2000), and CDMA in general or any other type of wireless communication system.

The features of the present invention may be incorporated into an integrated circuit (IC) or be configured in a circuit comprising a multitude of interconnecting components.

The present invention will be described in reference to an HSDPA and an EU, and the terms HSDPA and EU are used interchangeably with DL and UL, respectively. However, it should be understood that the reference to an HSDPA and an EU is just for describing the preferred embodiment of the present invention, and the teachings of the present invention may be applied to any system for utilizing a common control channel for transmitting channel assignment information for both UL and DL transmissions simultaneously.

FIG. 1 is a block diagram of a system 100 for supporting UL and DL operations in accordance with the present invention. The system 100 includes an RNC 102, a Node-B 104, and a WTRU 106. The Node-B 104 is controlled by the RNC 102, and dynamically allocates radio resources for both UL and DL transmissions from and to the WTRU 106. Three channels are established between the Node-B 104 and the WTRU 106. The channels are a DL channel 108, a UL channel 110, and a common control channel 112. The common control channel 112 is utilized for transmission of channel assignment information for both UL and DL transmissions.

The Node-B 104 is configured to support an HSDPA and EU operation. Therefore, each Node-B 104 dynamically allocates radio resources for DL and UL transmissions to and from the WTRU 106 through an HS-DSCH and an EU channel, respectively. The radio resources assignment information for both the HS-DSCH and the EU is transmitted through the common control channel 112.

In accordance with the present invention, the common control channel 112 is utilized for the transmission of radio resources assignment information for both UL and DL transmissions and a specific indication is provided to distinguish whether the radio resource assignment is for either UL or DL transmission. Therefore, the common control channel 112 occupies a shared DL radio resource space, as defined by a set of SF=128 channelization codes, for both DL and UL transmissions simultaneously, and the WTRU 106 is configured to recognize whether a particular transmission is intended for assigning radio resources for the DL or the UL transmissions.

Figure 2:
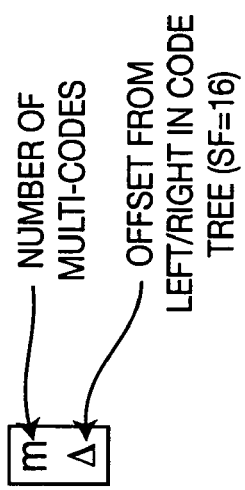
FIG. 2 is a look-up table for channelization code set mapping in an HSDPA, which is utilized in conjunction with the system of FIG. 1.

In accordance with a first embodiment of the present invention, an indication that a particular radio resource is assigned for a UL transmission is provided by means of one or more of the impossible combinations in the channelization code set mapping in a current HSDPA. FIG. 2 is a look-up table for channelization code set mapping currently used in the HSDPA. An HS-SCCH uses seven (7) bits to inform the WTRU 106 which SF=16 channelization codes are used for the corresponding HS-DSCH. Out of the 128 possible combinations, eight (8) combinations are not currently used in an HSDPA (see the labeled "redundant area" in FIG. 2). One or more of the eight (8) unused combinations is used for assigning radio resources or indicating that the demodulated transmission is for UL transmission, not DL transmission. Therefore, if the WTRU 106 determines that a channelization-code-set corresponds to one of the impossible combinations of FIG. 2, the WTRU 106 recognizes that the transmission is for assignment of radio resources for UL transmission, rather than DL transmission, or that the codes corresponding to the channelization-code-set are assigned to UL transmissions.

In accordance with a second embodiment of the present invention, an indication that a particular radio resource is assigned for UL transmission is provided by means of a WTRU-specific CRC. Under current HSDPA specifications, a WTRU-specific CRC is contained in an HS-SCCH field 2. A 16-bit CRC is computed from the information to be transmitted, and the computed CRC is masked with a unique 16-bit WTRU identity (ID). The masked CRC is transmitted to a WTRU 106 as a WTRU-specific CRC.

In accordance with the second embodiment of the present invention, this WTRU-specific CRC is modified in a unique and deterministic way to indicate that the demodulated transmission is for UL transmission, rather than DL transmission. For example, a WTRU-specific CRC computed for an HSDPA is inverted for an EU before performing a channel coding. A WTRU 106 performs two (2) different comparisons, preferably simultaneously, in performing a CRC of the received transmission. If the WTRU 106 succeeds in decoding the received transmission with a WTRU-specific CRC, the WTRU 106 recognizes that the transmission is intended for an HSDPA, and if the WTRU 106 succeeds in decoding the received transmission with an inverted WTRU-specific CRC, the WTRU 106 recognizes that the transmission is intended for an EU.

In accordance with a third embodiment of the present invention, an indication that a particular radio resource is assigned for an EU is provided by means of a WTRU-specific masking sequence. Under current HSDPA specifications, a 40-bit sequence of field 1 is masked with a 40-bit WTRU-specific intermediate code sequence which is generated from a 16-bit WTRU ID.

In accordance with the third embodiment, the WTRU-specific masking on field 1 is modified in a unique and deterministic way to indicate that a transmission is intended for an EU, not for an HSDPA. For example, the inverted 16-bit CRC generated in the second embodiment may be used to derive the 40-bit long masking sequence. If the WTRU 106 succeeds in decoding the received transmission with a WTRU-specific masking sequence, the WTRU 106 recognizes that the transmission is intended for an HSDPA, and if the WTRU 106 succeeds in decoding the received transmission with an inverted WTRU-specific masking sequence, the WTRU 106 recognizes that the transmission is intended for an EU.

With this method, the WTRU 106 can make the distinction whether an EU or an HSDPA channel assignment has been transmitted after having received only field 1 of the HS-SCCH transmission.

Alternatively, WTRU IDs are allocated by the network in such a way that a particular WTRU ID does not collide with another WTRU ID. For example, a first WTRU's inverted ID for EU may be used to indicate a second WTRU's HSDPA service. Therefore, simultaneous detection of presence of a UL resource assignment channel and an HS-SCCH is facilitated.

In accordance with a fourth embodiment of the present invention, an indication that a particular radio resource is assigned for an EU is provided by means of radio resource control (RRC) context signaling. Preferably, a Node-B 104 allocates separate radio resources for transmission of UL radio resources assignment and DL radio resources assignment. Alternatively, an RNC 102 allocates separate radio resources for transmission of UL radio resources assignment and DL radio resources assignment by using RRC signaling messages.

For example, an RRC signaling message from the RNC 102 may inform a WTRU 106 in which TTIs to expect an HS-SCCH or a UL resource assignment channel. Under current R5 HSDPA specifications, fifteen (15) time slots include one (1) frame, and three (3) time slots include one (1) TTI. "Even" TTIs may include, for example, time slots 2, 4, 6, 8, 10, 12 and 14, and "odd" TTIs may include, for example, time slots 1, 3, 5, 7, 9, 11, 13 and 15.

In accordance with the present invention, an RRC transmits signals indicating that a transmission in "even" TTIs is for an HS-SCCH and a transmission in "odd" TTIs is for a UL resource assignment channel. By not allowing a transmission for an HS-SCCH to be transmitted in "odd" TTIs, backwards compatibility with R5 WTRUs can be ensured. The same set of SF=128 resources can be used for an HS-SCCH and a UL resource assignment channel.

In accordance with a fifth embodiment of the present invention, an indication that a particular radio resource is assigned for an EU is provided by means of layer 1 indication on an associated DL dedicated channel (DCH). One or more bits on the associated DL DCH are used to indicate imminent occurrence of a UL resource assignment channel as opposed to an HS-SCCH by means of a fixed and pre-determined timing relationship.

Figure 3:
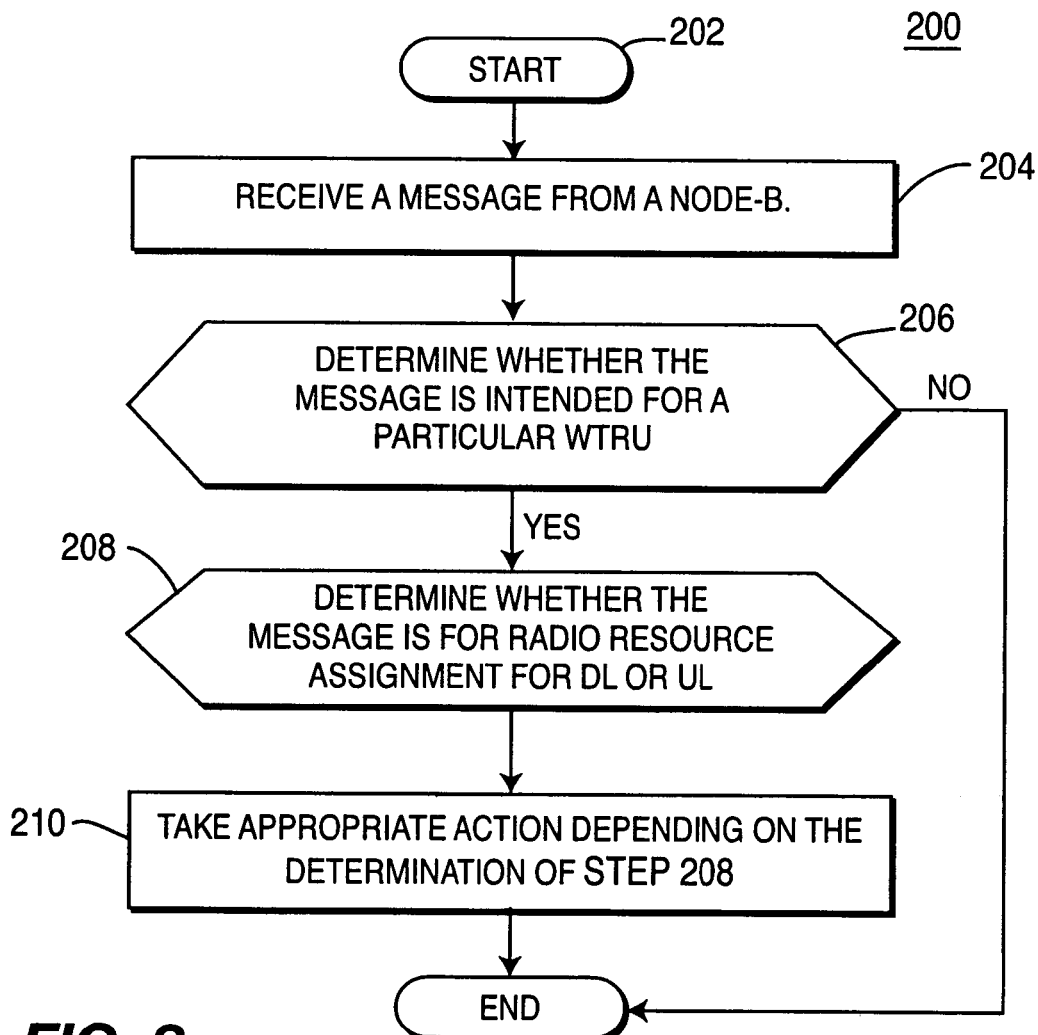
FIG. 3 is a flowchart of a process including method steps for implementing uplink channel assignment signaling in accordance with the present invention.

FIG. 3 is a flowchart of a process 200 including method steps for implementing UL channel assignment signaling in accordance with the present invention. After the process 200 is initiated (step 202), a message for radio resource assignment is transmitted via a common control channel from a Node-B 104 to a WTRU 106. The WTRU 106 receives and demodulates the message using predetermined codes every predetermined TTI, for example, every 2 ms (step 204). The WTRU 106 then determines if the message is intended for the WTRU 106 (step 206). A WTRU-specific CRC may be utilized for this purpose. If the WTRU 106 determines that the message is intended for the WTRU 106, the WTRU 106 determines whether the message is for the assignment of radio resources for DL transmission or UL transmission implementing one of the embodiments of the present invention described above (step 208). The WTRU 106 then takes appropriate actions (step 210) depending on the decision in step 208 to receive or transmit data packet via DL or UL channels. For example, the WTRU 106 may recognize exactly when to initialize a data reception procedure via the DL channel 108 or when to initialize a data transmission procedure via the UL channel 110. Currently, an HS-SCCH for an HSDPA announces an incoming data packet for the WTRU with a fixed two (2) slot offset, whereas the present invention can inform the WTRU when it has an opportunity to transmit a packet via the UL, (e.g., four slots from now).

While this invention has been particularly shown and described with reference to preferred embodiments, it will be understood by those skilled in the art that various changes in form and details may be made therein without departing from the scope of the invention described hereinabove.

What is claimed is:

1. In a wireless communication system including at least one Node-B and at least one wireless transmit/receive unit (WTRU), a method for selectively assigning radio resources for one of an enhanced uplink (EU) channel and a high speed downlink packet access (HSDPA) channel via common channel assignment information, the common channel assignment information being transmitted from the Node-B to the WTRU via at least one control channel, the method comprising:
   (a) the WTRU receiving a message from the Node-B via the at least one control channel, the message including the common channel assignment information and an indication of whether the common channel assignment information is intended for assigning radio resources to the EU channel or the HSDPA channel;
   (b) the WTRU determining whether the message is intended for the WTRU;
   (c) the WTRU detecting the indication; and
   (d) the WTRU taking an appropriate action based on the detected indication at step (c), whereby radio resources are selectively assigned for one of the HSDPA channel and the EU channel via the common channel assignment information.

2. The method of claim 1 wherein the appropriate action includes the WTRU initializing a data reception procedure via the HSDPA channel.

3. The method of claim 1 wherein the appropriate action includes the WTRU initializing a data transmission procedure via the EU channel.

4. The method of claim 1 wherein the indication is a utilization of a set of mapping combinations for channelization codes for the EU channel or the HSDPA channel.

5. The method of claim 1 wherein the indication is a utilization of a WTRU-specific cyclic redundancy check (CRC) for the EU channel or the HSDPA channel.

6. The method of claim 5 wherein the WTRU-specific CRC for the EU channel is an inverted version of the WTRU-specific CRC for the HSDPA channel.

7. The method of claim 5 wherein the WTRU-specific CRC is generated using an identification (ID) assigned to the WTRU.

8. A wireless communication system for selectively assigning radio resources for one of an enhanced uplink (EU) channel and a high speed downlink packet access (HSDPA) channel, the system comprising:
   (a) at least one Node-B; and
   (b) at least one wireless transmit/receive unit (WTRU) in communication with the Node-B via at least one control channel, the EU channel and the HSDPA channel, wherein:
      (i) the WTRU receives a message from the Node-B via the at least one control channel, the message including common channel assignment information and an indication of whether the common channel assignment information is intended for assigning radio resources to the EU channel or the HSDPA channel;
      (ii) the WTRU determines whether the message is intended for the WTRU;
      (iii) the WTRU detects the indication; and
      (iv) the WTRU takes an appropriate action based on the detected indication, whereby radio resources are selectively assigned for one of the HSDPA channel and the EU channel via the common channel assignment information.

9. The system of claim 8 wherein the appropriate action includes the WTRU initializing a data reception procedure via the HSDPA channel.

10. The system of claim 8 wherein the appropriate action includes the WTRU initializing a data transmission procedure via the EU channel.

11. The system of claim 8 wherein the indication is a utilization of a set of mapping combinations for channelization codes for the EU channel or the HSDPA channel.

12. The system of claim 8 wherein the indication is a utilization of a WTRU-specific cyclic redundancy check (CRC) for the EU channel or the HSDPA channel.

13. The system of claim 12 wherein the WTRU-specific CRC for the EU channel is an inverted version of the WTRU-specific CRC for the HSDPA channel.

14. The system of claim 12 wherein the WTRU-specific CRC is generated using an identification (ID) assigned to the WTRU.

15. A wireless transmit/receive unit (WTRU) comprising:
   (a) means for receiving a message including common channel assignment information and an indication of whether the common channel assignment information is intended for assigning radio resources to an enhanced uplink (EU) channel or a high speed downlink packet access (HSDPA) channel, radio resources for the EU channel and the HSDPA channel being dynamically and selectively allocated by the common channel assignment information;
   (b) means for determining whether the message is intended for the WTRU;
   (c) means for detecting the indication; and
   (d) means for taking an appropriate action based on the detected indication, whereby radio resources are selectively assigned for one of the HSDPA channel and the EU channel via the common channel assignment information.

16. The WTRU of claim 15 wherein the appropriate action includes the WTRU initializing a data reception procedure via the HSDPA channel.

17. The WTRU of claim 15 wherein the appropriate action includes the WTRU initializing a data transmission procedure via the EU channel.

18. The WTRU of claim 15 wherein the indication is a utilization of a set of mapping combinations for channelization codes for the EU channel or the HSDPA channel.

19. The WTRU of claim 15 wherein the indication is a utilization of a WTRU-specific cyclic redundancy check (CRC) for the EU channel or the HSDPA channel.

20. The WTRU of claim 19 wherein the WTRU-specific CRC for the EU channel is an inverted version of the WTRU-specific CRC for the HSDPA channel.

21. The WTRU of claim 19 wherein the WTRU-specific CRC is generated using an identification (ID) assigned to the WTRU.

22. An integrated circuit (IC) comprising:
   (a) means for receiving a message including common channel assignment information and an indication of whether the common channel assignment information is intended for assigning radio resources to an enhanced uplink (EU) channel or a high speed downlink packet access (HSDPA) channel, radio resources for the EU channel and the HSDPA channel being dynamically and selectively allocated by the common channel assignment information;
   (b) means for determining whether the message is received at its intended destination;
   (c) means for detecting the indication; and
   (d) means for taking an appropriate action based on the detected indication, whereby radio resources are selectively assigned for one of the HSDPA channel and the EU channel via the common channel assignment information.

23. The IC of claim 22 wherein the appropriate action includes initializing a data reception procedure via the HSDPA channel.

24. The IC of claim 22 wherein the appropriate action includes initializing a data transmission procedure via the EU channel.

25. The IC of claim 22 wherein the indication is a utilization of a set of mapping combinations for channelization codes for the EU channel or the HSDPA channel.

26. The IC of claim 25 wherein the indication is a utilization of a WTRU-specific cyclic redundancy check (CRC) for the EU channel or the HSDPA channel.

27. The IC of claim 26 wherein the WTRU-specific CRC for the EU channel is an inverted version of the WTRU-specific CRC for the HSDPA channel.

28. The IC of claim 26 wherein the WTRU-specific CRC is generated using an identification (ID) assigned to the WTRU.

29. A time-slotted wireless communication system for selectively assigning radio resources for one of an enhanced uplink (EU) channel and a high speed downlink packet access (HSDPA) channel via common channel assignment information, the system comprising:
   (a) at least one Node-B;
   (b) a radio network controller (RNC) which controls the Node-B; and
   (c) at least one wireless transmit/receive unit (WTRU) which communicates with the Node-B via at least one control channel, an EU channel and an HSDPA channel, wherein the RNC transmits a message to the WTRU indicating which transmission time intervals (TTIs) of the at least one control channel support transmission of the common channel assignment information for the EU channel and which TTIs of the at least one control channel support transmission of the common channel assignment information for the HSDPA channel, whereby radio resources are selectively assigned for one of the HSDPA channel and the EU channel via the common channel assignment information.

30. The system of claim 29 wherein the system is a frequency division duplex (FDD) system.

31. The system of claim 29 wherein the message comprises radio resource control (RRC) context signaling.

32. The system for claim 29 wherein a high speed shared control channel (HS-SCCH) is transmitted in the TTIs that support transmission of the common channel assignment information for the HSDPA channel.

33. The system for claim 29 wherein an EU resource assignment channel is transmitted in the TTIs that support transmission of the common channel assignment information for the EU channel.

34. The system for claim 29 wherein the WTRU determines whether the message is for assigning radio resources for HSDPA transmission or EU transmission.

35. In a time-slotted wireless communication system including at least one Node-B in communication, a radio network controller (RNC) which controls the Node-B, and at least one wireless transmit/receive unit (WTRU) which communicates with the Node-B via at least one control channel, an enhanced uplink (EU) channel and a high speed downlink packet access (HSDPA) channel, a method for assigning radio resources for one of the EU channel and the HSDPA channel via common channel assignment information, the method comprising:
   the RNC transmitting a message to the WTRU indicating which transmission time intervals (TTIs) of the at least one control channel support transmission of the common channel assignment information for the EU channel and which TTIs of the at least one control channel support transmission of the common channel assignment information for the HSDPA channel, whereby radio resources are selectively assigned for one of the HSDPA channel and the EU channel via the common channel assignment information.

36. The method of claim 35 wherein the system is a frequency division duplex (FDD) system.

37. The method of claim 35 wherein the message comprises radio resource control (RRC) context signaling.

38. The method for claim 35 further comprising transmitting a high speed shared control channel (HS-SCCH) in the TTIs that support transmission of the common channel assignment information for the HSDPA channel.

39. The method for claim 35 further comprising transmitting an EU resource assignment channel in the TTIs that support transmission of the common channel assignment information for the EU channel.

40. The method for claim 35 further comprising the WTRU determining whether the message is for assigning radio resources for HSDPA transmission or EU transmission.

41. In a wireless communication system including at least one Node-B and at least one wireless transmit/receive unit (WTRU), a method for selectively assigning radio resources for one of an enhanced uplink (EU) channel and a high speed downlink packet access (HSDPA) channel using common channel assignment information, the common channel assignment information being transmitted from the Node-B to the WTRU via at least one control channel, the method comprising:

the WTRU receiving the common channel assignment information via the at least one control channel;

the WTRU determining whether the common channel assignment information is for assigning radio resources to the EU channel or the HSDPA channel; and the WTRU communicating with the Node-B using the common channel assignment information, whereby radio resources are selectively assigned for one of the HSDPA channel and the EU channel via the common channel assignment information.

42. A wireless communication system for selectively assigning radio resources for one of an enhanced uplink (EU) channel and a high speed downlink packet access (HSDPA) channel using common channel assignment information, the system comprising:

at least one Node-B; and at least one wireless transmit/receive unit (WTRU) in communication with the Node-B via at least one control channel, the EU channel and the HSDPA channel, wherein the WTRU is configured to:

receive the common channel assignment information via the at least one control channel;

determine whether the common channel assignment information is for assigning radio resources to the EU channel or the HSDPA channel; and communicate with the Node-B using the common channel assignment information, whereby radio resources are selectively assigned for one of the HSDPA channel and the EU channel via the common channel assignment information.

\* \* \* \* \*